Nov. 10, 1953  E. SARVOY  2,658,435
CAMERA BELT SUPPORT
Filed Aug. 20, 1951  2 Sheets-Sheet 1

INVENTOR.
Elmer Sarvoy
BY Victor J. Evans & Co.
ATTORNEYS

Nov. 10, 1953     E. SARVOY     2,658,435
CAMERA BELT SUPPORT
Filed Aug. 20, 1951     2 Sheets-Sheet 2
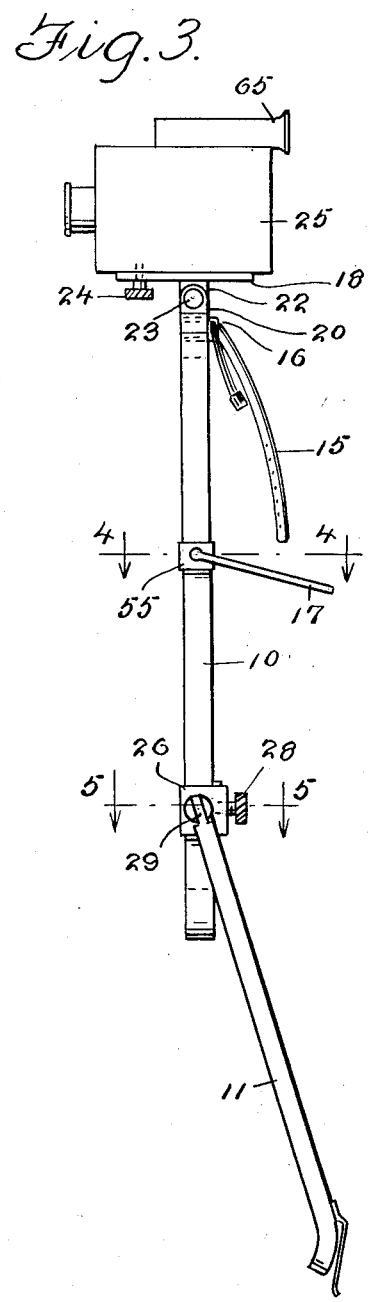
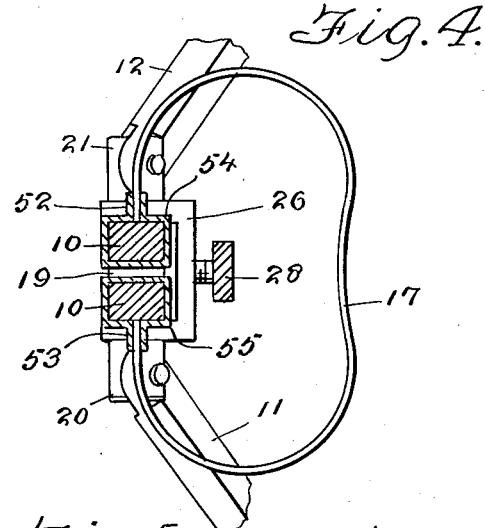
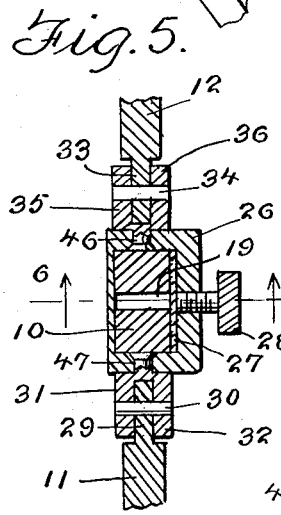
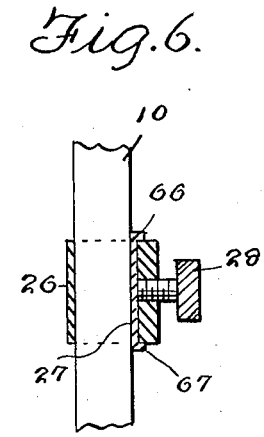
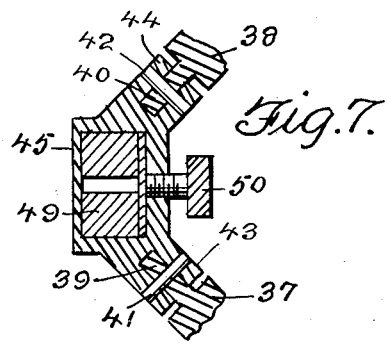
INVENTOR.
Elmer Sarvoy
BY Victor J. Evans & Co.
ATTORNEYS Patented Nov. 10, 1953

2,658,435

UNITED STATES PATENT OFFICE 2,658,435

CAMERA BELT SUPPORT

Elmer Sarvoy, Miami, Fla.

Application August 20, 1951, Serial No. 242,594

2 Claims. (Cl. 95—86)

This invention relates to camera supporting devices, such as tripods, and in particular an adjustable support having arms with hooks on the lower ends for supporting a camera from the belt of a photographer and a band for holding the upper end of the support around the neck of the photographer whereby a camera is supported with the eye piece in alignment with an eye of the photographer with the arms and hands free.

The purpose of this invention is to provide means for adjustably supporting a camera from the belt of a photographer so that the hands of the photographer are free to facilitate adjusting the focus and operate the shutter.

In the conventional type of tripod a camera is supported in a comparatively low position and it is inconvenient and also difficult to look through the eye piece and at the same time bring the lens into focus. Furthermore with a tripod positioned on the ground and the head of the photographer covered with a dark cloth persons passing by the camera often strike one of the legs of the tripod, generally damaging the camera. With these thoughts in mind this invention contemplates a support in the form of a tripod with the legs or arms placed over a belt of a photographer, and with a strap around the neck the camera is suspended in position whereby the arms and hands are free.

Another object of the invention is to provide means for supporting a camera in operative position upon the body of a photographer wherein the position of the camera is readily adjustable.

A further object of the invention is to provide a camera supporting device whereby a camera is positioned to correspond with the eye of a photographer generally used for bringing the camera into focus which is of a comparatively simple and economical construction.

With these and other objects and advantages in view the invention embodies a post having a longitudinally positioned elongated slot therein with arms having hooks on the ends adjustably mounted on the post, with camera mounting means on the upper end of the post and with a strap for holding the upper end of the post around the neck of a photographer, on whose belt the arms are positioned.

Other features and advantages of the invention will appear from the following description taken in connection with the drawings wherein:

Figure 3 is a side elevational view of the device.

Figure 4 is a cross section through the support taken on line 4—4 of Fig. 3 and showing parts of the arms broken away.

Figure 5 is a cross section through the lower part of the support taken on line 5—5 of Fig. 3 illustrating the connections of the arms to the vertically disposed post.

Figure 6 is a vertical section taken on line 6—6 of Fig. 5 showing the clamp for holding the arms to the post.

Figure 7 is a detail illustrating a modification wherein the arms are angularly positioned in relation to the post.

Figure 1:
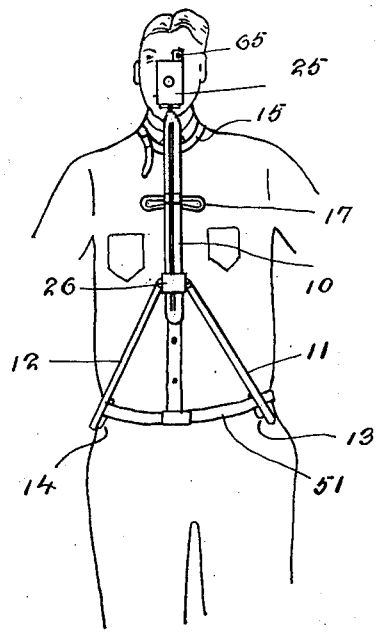
Figure 1 is a front elevational view illustrating the camera belt pod in use whereby a camera is supported in an operative position with the eye piece thereof in front of one of the eyes of a photographer on which the device is mounted.

Referring now to the drawings wherein reference characters denote corresponding parts the camera support of this invention includes a post 10, arms 11 and 12 pivotally mounted on the post and having hooks 13 and 14 on the ends thereof, a strap 15 extended through an eye 16 on the upper end of the post, a wire rest 17, and a camera mounting plate 18 adjustably mounted on the upper end of the post.

In the design illustrated in Figs. 1 to 6 inclusive, the post 10 is formed of a rectangularly shaped bar having an elongated slot 19 therein and the upper end is provided with ears 20 and 21 between which a flange 22 extended downwardly from the plate 18 is clamped by a thumb screw 23.

The plate 18 is also provided with a thumb screw 24 by which a camera, as indicated by the numeral 25 is secured to the plate.

The arms 11 and 12 are pivotally mounted on the sides of a sliding collar 26, as illustrated in Fig. 5. The collar 26 is provided with a bearing plate 27 that is clamped against the surface of the post 10 by a thumb screw 28 whereby the position of the collar, with the arms 11 and 12 is adjustable on the post.

The arm 11 is provided with a tongue 29 that is pivotally mounted by a pin 30 between angularly disposed ears 31 and 32 on one side of the post and the arm 12 is provided with a similar tongue 33 that is pivotally mounted by a pin 34 between similar ears 35 and 36 on the opposite side of the post.

The arms 11 and 12 may be connected to the collar 26 by pins 46 and 47, as shown in Figure 5, thereby providing swivel connections.

In the design illustrated in Fig. 7 the arms 37 and 38 having tongues 39 and 40 thereon, respectively, are pivotally mounted by pins 41 and 42 in sockets 43 and 44, the socket 43 being extended from one side of a collar 45 and the socket 44 extended from the opposite side of the collar. In this design the collar is provided with a bearing plate 48 and the collar is clamped to a post 49 by a thumb screw 50.

The ends of the arms 11 and 12, and 37 and 38, are provided with spring clips, similar to the clips 13 shown on the end of the arm 11 in Fig. 3, and these spring clips are positioned to extend over a belt 51 of a photographer with the parts in position, as illustrated in Fig. 1.

Figure 2:
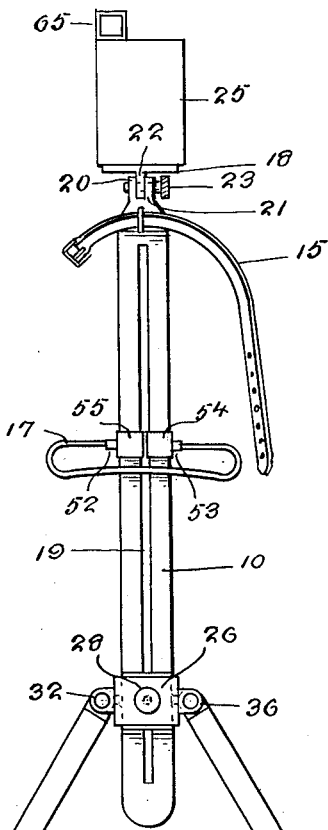
Figure 2 is a rear elevational view of the device on an enlarged scale illustrating the relative positions of the parts.

The ends of the wire rest 17 are frictionally held in sockets 52 and 53 on the sides of friction collars 54 and 55 which are slidably mounted on the side members of the post 10 as illustrated in Figs. 2 and 4 and with the rest mounted in this manner it may readily be adjusted to hold a camera a comfortable distance from the face of a photographer.

Figure 9:
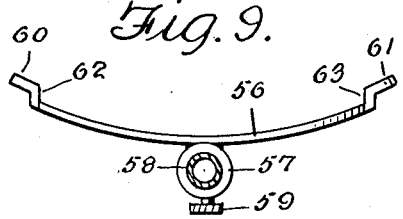
Figure 9 is a sectional plan through the post and showing the arms of the modification illustrated in Fig. 8.
Figure 8:
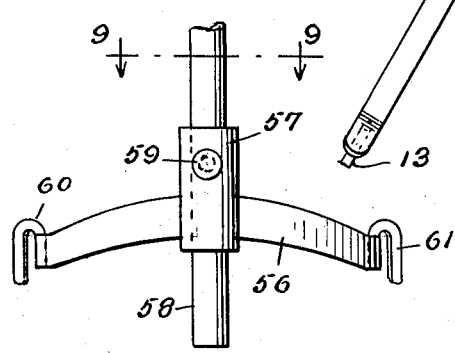
Figure 8 is a detail illustrating a further modification wherein a supporting arm is mounted on a sleeve adjustably mounted on a tubular post.

In the design illustrated in Figs. 8 and 9 the supporting arms 11 and 12 are replaced by an arcuate bar 56 which is mounted on a sleeve 57 that is slidably mounted on a post 58 and that is secured in adjusted position by a thumb screw 59. The ends of the bar 56 are provided with hooks 60 and 61 and, as illustrated in Fig. 9 the hooks are provided with offset sections 62 and 63, respectively, to facilitate placing the hooks over the belt 51.

With the parts arranged in the designs as illustrated the transversely positioned rest 17 is vertically adjustable on the post and the supporting arms with the hooks that are positioned over the belt of a photographer are also vertically adjustable on the post, the position of a camera is readily adjustable whereby a photographer on which the camera is supported may readily look through the eye piece, which is indicated by the numeral 65 and the arms and hands of the photographer are free for focusing and operating the shutter, flashlight, or other parts of the camera.

It will be noted that one side of the collar 26 is relatively thick to accommodate the threads of the thumb screw 28 and the bearing plates 27 and 48 are provided with lips on the ends as indicated by the numerals 66 and 67 whereby the plates are retained in position.

It will be understood that other modifications may be made in the design and arrangement of the parts without departing from the spirit of the invention.

What is claimed is:

1. A camera support comprising a vertically disposed post, a collar slidably mounted on the post, arms with belt receiving hooks on the ends pivotally mounted on the collar, a strap attached to the upper part of the post, a transversely positioned rest adjustably mounted on the post and a camera mounting plate positioned on the upper end of the post.

2. In a camera support, the combination which comprises a vertically disposed post having an elongated slot therein, a collar having a thumb screw therein slidably mounted on the post, arms with hooks on the extended ends pivotally mounted on said collar, a rest adjustably mounted on the post, a strap freely held on the upper part of the post, and a camera mounting plate adjustably mounted on the upper end of the post.

ELMER SARVOY.

References Cited in the file of this patent

UNITED STATES PATENTS

| Number | Name | Date |
|--------|------|------|
| 817,207 | Wheeler | Apr. 10, 1906 |